United States Patent [19]
Millard et al.

[11] Patent Number: 5,429,202
[45] Date of Patent: Jul. 4, 1995

[54] ANTI-ROLL MECHANISM FOR A RACK AND PINION

[75] Inventors: Barry J. Millard; Kenneth Chandler, both of Reading, England

[73] Assignee: Adwest Engineering Limited, Reading, England

[21] Appl. No.: 117,167

[22] PCT Filed: Mar. 19, 1992

[86] PCT No.: PCT/GB92/00493
§ 371 Date: Jan. 27, 1994
§ 102(e) Date: Jan. 27, 1994

[87] PCT Pub. No.: WO92/16404
PCT Pub. Date: Oct. 1, 1992

[30] Foreign Application Priority Data
Mar. 20, 1991 [GB] United Kingdom ............... 9105903

[51] Int. Cl.6 .................................. B62D 3/12
[52] U.S. Cl. ......................... 180/79; 74/422; 74/842; 180/147
[58] Field of Search ............. 180/147, 148, 146, 79; 74/842, 840, 422, 424.6

[56] References Cited
U.S. PATENT DOCUMENTS

| | | | |
|---|---|---|---|
| 2,193,898 | 3/1940 | Carter et al. | 180/148 |
| 3,157,061 | 11/1964 | Parker | 74/498 |
| 3,897,845 | 8/1975 | Von Löwis of Menar | 180/148 |
| 4,584,893 | 4/1986 | Harding et al. | 74/422 |
| 4,599,911 | 7/1986 | Rosell | 180/148 |
| 4,986,382 | 1/1991 | Harrison | 180/148 |

FOREIGN PATENT DOCUMENTS
8712285 10/1987 Germany.

Primary Examiner—Margaret A. Focarino
Assistant Examiner—Kevin Hurley
Attorney, Agent, or Firm—Finnegan, Henderson, Farabow, Garrett & Dunner

[57] ABSTRACT

A rack and pinion apparatus comprising a toothed rack, the tops of the teeth of which lie in a common plane, the rack and pinion apparatus further comprising an anti-roll mechanism having a rack teeth engaging pad mounted to permit relative movement between the rack and teeth engaging means and so as to be in contact, at any given instant, with the tops of at least two rack teeth.

13 Claims, 3 Drawing Sheets

ANTI-ROLL MECHANISM FOR A RACK AND PINION

This invention relates to anti-roll mechanisms for rack and pinions and has been conceived in connection with a rack and pinion for a vehicle steering mechanism and will primarily be discussed in relation thereto. However, it is to be noted that the invention is applicable to rack and pinions used in other than vehicle steering mechanisms.

A rack and pinion is a widely accepted mechanism for steering motor vehicles and it is recognised that to achieve positive steering, mesh clearance (backlash) between the teeth of the rack and pinion needs to be kept to a minimum. Ideally, zero backlash is required but manufacturing tolerances, however tight, make this virtually impossible without involving extra components and/or machining operations which introduce unacceptable higher manufacturing costs.

It is common to employ a pinion with helical teeth and this gives rise to a force which imparts a rocking motion to the rack. FIG. 1 of the accompany drawings illustrates a known rack and pinion for a steering mechanism in which the rack 1 is supported for axial sliding movement in a support 2, the rack being formed from cylindrical stock and the support being provided with a corresponding part-cylindrical support surface 3. The teeth 4 of the helical pinion 5 mesh with the teeth 6 of the rack 1 and on rotation, the pinion generates an axial force $F_{AX}$ along its axis of rotation, which force acts at the pitch line P of the rack 1, the distance between the pitch line and the longitudinal axis of the rack 1 representing a moment arm M. The rotational force or torque T acting on the rack 1 is thus:

$$T = F_{AX} \times M$$

This torque is resisted locally at the ends of the rack teeth 6, giving rise to wear and/or damage. Clearly, this is undesirable especially when long term use is essential as in a vehicle steering mechanism.

Attempts have been made to minimise the rocking motion of the rack 1 due to the torque T, one arrangement being to provide inclined faces on the rack to give a general v-shaped cross-section to the rack as illustrated in FIG. 2 of the accompanying drawings. The support 2 for the rack 1 has a corresponding V-shaped mating surface 3 formed therein. In view of the accuracy required, the inclined faces have to be machined and it will be appreciated that it is not a simple matter to effect this machining, relative to the rack teeth 6, without tolerance or error and to produce likewise the mating surface 3 on the support 2. Furthermore, additional errors are likely to be introduced when assembling the anti-roll mechanism in the housing of the steering mechanism. Consequently, not only is this anti-roll mechanism relatively expensive to manufacture, but the cumulative errors or tolerances contribute to a reduction in efficiency of operation of the rack and pinion, particularly the freedom of movement of the rack, which is unacceptable.

The primary object of the present invention is to provide an anti-roll mechanism for a rack and pinion which is relatively inexpensive to manufacture but which is effective without detracting from the efficiency of operation of the rack and pinion.

According to the present invention, there is provided rack and pinion apparatus comprising a toothed rack, the tops of the teeth of which lie in a common plane, the rack and pinion apparatus further comprising an anti-roll mechanism having rack-teeth-engaging means mounted to permit relative movement between the rack and teeth-engaging means and so as to be in contact, at any given instant, with the tops of at least two teeth of the rack.

Inasmuch as it is common practice to provide flat tops to the rack teeth and to ensure that these tops are co-planar, then the present invention makes use of this existing "surface" to provide the means for preventing rolling or rocking motion of the rack, thus dispensing with the relatively expensive machining or manufacturing equipment discussed above.

The teeth-engaging means of the anti-roll mechanism may comprise a hardened pad, preferably supported in a carrier which is provided with means for adjusting the pad relative to the rack teeth in order to accommodate manufacturing tolerances. The pad may be part cylindrical with the carrier having a complementary part-cylindrical bearing surface to permit relative movement between the pad and carrier for alignment purposes.

Instead of a pad, the teeth-engaging means may comprise one or more hardened rollers, each roller being arranged to be in engagement, at any given instant, with the tops of at least two rack teeth, the rack teeth necessarily being skewed with respect to the longitudinal axis of the rack for anti-roll rollers to be employed. If the amount of skew of the rack teeth is great enough, it is possible to employ a single roller because the latter will not be able to fall into the space between adjacent teeth which, if this were to happen, would negate the anti-roll function of the roller. When the skew of the rack teeth is not sufficient for a single roller to be employed, then two rollers may be used which are spaced apart such as to ensure that any given instant, at least one of the rollers is in contact with the flat tops of at least two teeth even if the other roller is located over the space between adjacent teeth. The or each roller may be mounted in a carrier which is mounted relative to the rack such that a roller cannot engage the space between two teeth.

The anti-roll mechanism of the present invention may be employed in addition to, or instead of, the normal means employed to adjust the rack with respect to the pinion in order to set up the desired meshing relationship between the two.

Rack and pinion apparatus embodying the present invention will now be described in greater detail, by way of example, with reference to the accompanying drawings, in which.

Figure 3:
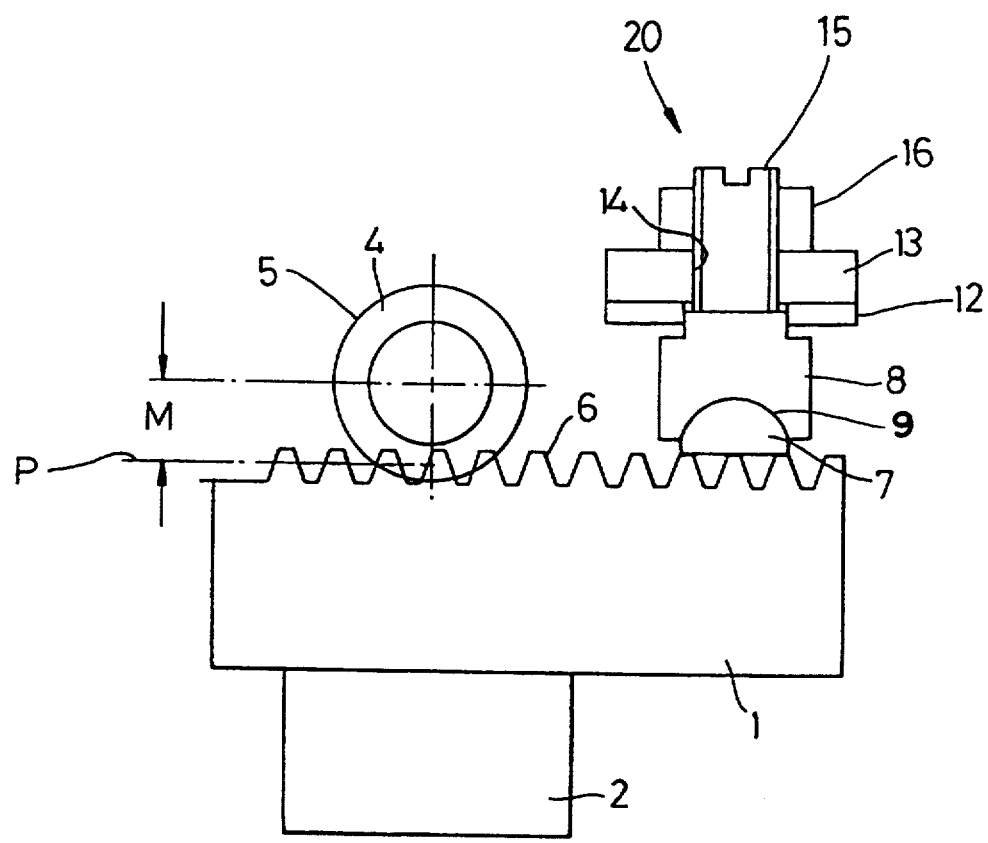
FIG. 3 is a diagrammatic side view of one embodiment of the present invention.
Figure 4:
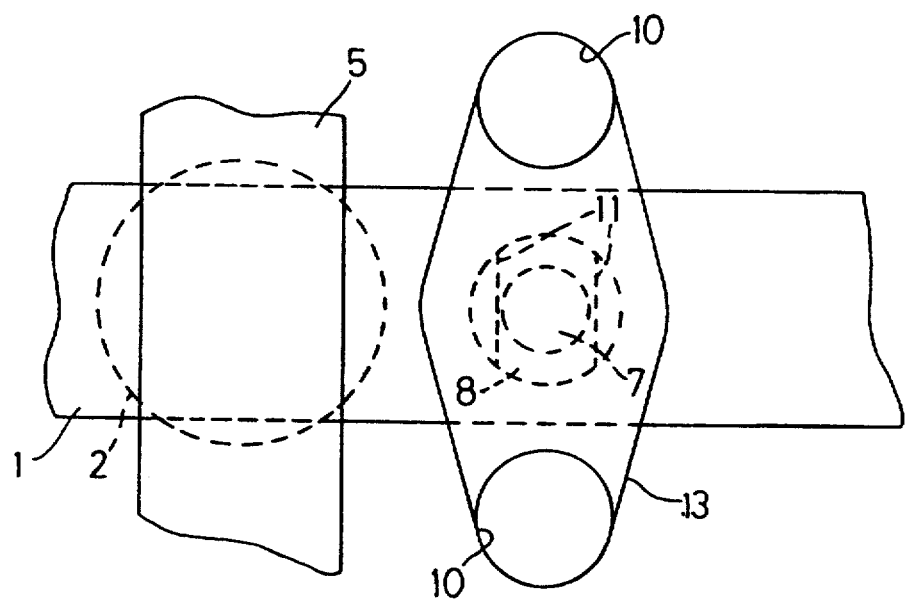
FIG. 4 is a plan view of FIG. 3.

Referring first to FIGS. 3 and 4, the first embodiment of the present invention by way of a rack and pinion apparatus comprises a rack 1, a rack support 2 and a pinion 5 with helically cut teeth 4, these components being similar to those described above with reference to FIG. 1 of the drawings. It will be seen that the teeth 6 of the rack 1 are provided with flat tops which are coplanar. The rack 1 is formed from cylindrical stock and conveniently, the teeth are formed in series production with a single-pass broach which cuts the root flanks and tops directly into the rack bar, whereby the tops of the teeth 6 being in accurate alignment, i.e. co-planar.

In accordance with the present invention an anti-roll mechanism 20 is provided comprising an anti-roll pad 7 of a hardened metal, such as steel, the pad having a part-cylindrical cross-section and being received in a pad-housing 8 which has a complementary part-cylindrical bearing surface 9, the pad being received therein in a manner which permits relative movement between these two components about the longitudinal axis of the pad 7 but not along that axis. The housing 8 is cylindrical but is provided with a pair of flats 11 at the end opposite to that in which the bearing surface 9 is formed and by which the housing is mounted, non-rotationally, in a key plate 12. Disposed over the key plate 12 is a closure plate 13 which is bolted, using the holes 10, to a housing of the steering mechanism of which the rack and pinion apparatus forms part but which is not shown in FIGS. 1 and 2 of the drawings. The closure plate 13 has a tapped hole 14 provided therein which receives an adjustment screw 15 by which the engagement of the anti-roll pad 7 with the rack teeth 6 is set and then locked into position by a lock nut 16.

Figure 1:
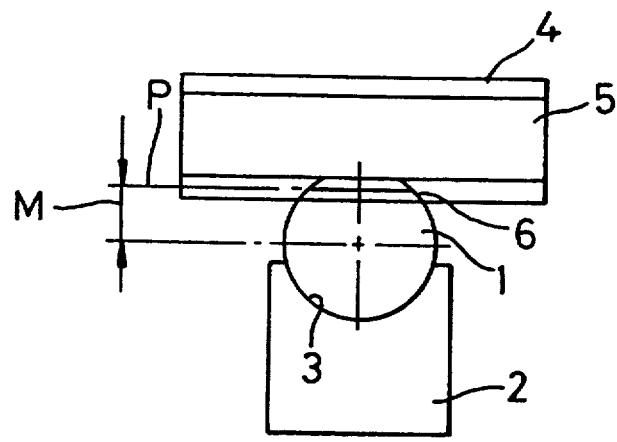
FIGS. 1 and 2 are diagrammatic illustrations of prior art rack and pinions.
Figure 2:
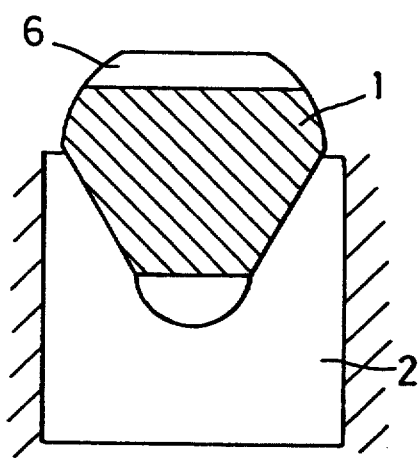

When the rack and pinion 1 and 5 are brought into basic meshing relationship, fine adjustment of this relationship is set by adjustment means associated with the rack support 2, this adjustment means not being shown in FIGS. 1 and 2 but being illustrated in FIG. 5 to which reference will be made hereafter. Following this adjustment, the anti-roll pad 7 is then adjusted into close contact with rack teeth 6, without overcoming the spring force of the adjustment means of the support 2, using the adjustment screw 15, the latter then being locked with the lock nut 16 in the selected position. In operation, the pinion 5 is rotated about a fixed axis and on rotation, moves the rack 1 to the left or the right, depending on the direction of rotation, this rack movement effecting steering movement of the vehicle and being augmented, in a power-assisted steering mechanism typically by hydraulic power. The rack 1 slides beneath the anti-roll pad 7, the latter serving to restrain the rack from any rocking movement about its longitudinal axis as a result of the torque imparted by the rotation of the pinion 5 as described above. It will be seen from FIG. 3 that the anti-roll pad 7 spans three of the rack teeth 6, and from FIG. 4 that the pad extends substantially across the full width of the flat top of the rack teeth 6, bearing in mind that although the roots of the rack teeth extend the full width of the rack, the tops are curtailed, in conventional manner, because of the use of cylindrical stock for the rack. It will be seen that the reaction force to the torque T is now between the top of the teeth 6 and the pad 7, rather than the teeth flanks and the pinion 5. Although the pad 7 needs to contact a major part of one tooth 6, it need only contact a minor part of one or more adjacent teeth.

Figure 5:
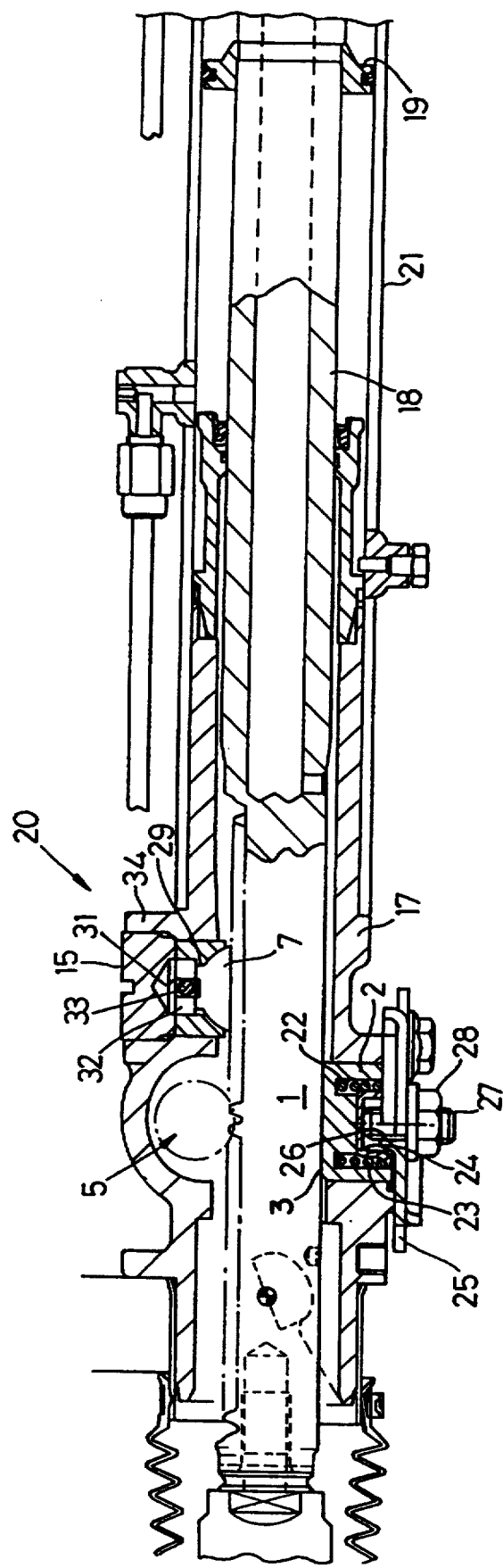
FIG. 5 is a cross-sectional view of a second embodiment of the present invention.

Turning now to FIG. 5, this shows part of a power-assisted vehicle steering mechanism comprising a housing 17 which is of cast construction and in which the rack 1 is mounted for sliding movement, the pinion 5 being shown only in outline. The right-hand end of the rack 1 is engaged by a ram 18 fitted with a piston ring 19 slidably mounted in a cylinder 21 fitted as a continuation to the housing 17. Hydraulic fluid is admitted to one side or other of the piston ring 19 in order to power assist movement of the rack 1, as appropriate.

The support 2 for the rack is provided with a recess 22 at the end opposite to that on which the bearing surface 3 is formed, this recess receiving a spring 23 over which is fitted a retaining plate 24. The recess 22 is closed by a closure plate 25 bolted to the steering mechanism housing 17. The closure plate 25 is provided with a tapped hole 26 which receives an adjustment screw 27 provided with a lock nut 28, the adjustment screw being used to adjust the meshing relationship between the rack 1 and pinion 5 as discussed above. On the side of the housing 17 opposite to the support 2 there is provided the anti-roll mechanism in accordance with the present invention which, as will be seen, is located immediately next to that part of the housing accommodating the pinion 5. The anti-roll mechanism 20 of this embodiment, of the invention comprises the same basic components as the anti-roll mechanism of FIGS. 3 and 4 but in this embodiment, the anti-roll pad 7 is provided with an extension 29 opposite the face in contact with the rack teeth 6, this extension being provided with a slot 31 and also receiving a collar 32 serving to retain a pin 33 within the slot 31. The pin 33 serves to prevent rotation of the anti-roll pad 7 about a vertical axis but allows movement about the longitudinal axis of the pad, as in the embodiment of FIGS. 3 and 4, to accommodate manufacturing tolerances. Thus, in this embodiment, the key plate 12 and closure plate 13 of the embodiment of FIGS. 3 and 4 are dispensed with. The adjustment screw 15 is threadedly received directly in a collar 34 provided in the housing 17 and is locked into position using a locking compound, for example. The setting up and operation of the anti-roll mechanism is as described with reference to FIGS. 3 and 4 of the drawings.

It will be appreciated that the anti-roll mechanism 20 of FIGS. 3 and 4 can be used in place of the mechanism 20 of FIG. 5.

The support 2 and the anti-roll pad housing 8 are conveniently formed from a PTFE-loaded material, such as a synthetic plastics material, in order to provide a bearing surface for the rack with a very low coefficient friction. Lubrication for the rack with respect both to the support 2 and the pad 7 is provided by grease, or other lubricant, provided within the housing 17 and being allowed to circulate around the components contained therein by virtue of the rack 1 being provided with a through bore.

It will be seen that the present invention provides a relatively simple but highly effective anti-roll mechanism for the rack of a rack and pinion apparatus and thus represents a significant advance in the art.

We claim:

1. Rack and pinion apparatus comprising a toothed rack having a plurality of teeth, the teeth having tops which lie in a common plane, an anti-roll mechanism having rack-teeth-engaging means mounted to permit relative movement between the rack and rack-teeth-engaging means, with the rack-teeth-engaging means being in contact with the tops of at least two of the teeth of the rack to restrain rolling of the rack about its longitudinal axis.

2. Rack and pinion apparatus comprising a toothed rack having a plurality of teeth, the teeth having tops which lie in a common plane, an anti-roll mechanism having rack-teeth-engaging means mounted to permit relative movement between the rack and the rack-teeth-engaging means with the rack-teeth-engaging means being in contact with the tops of at least two of the teeth of the rack to restrain rolling of the rack about its longitudinal axis, the rack-teeth-engaging means comprising a pad supported in a carrier provided with means for adjusting the pad relative to the teeth of the rack.

3. Apparatus according to claim 2, wherein the pad is mounted in the carrier for relative movement with respect to the carrier about at least one axis.

4. Apparatus according to claim 2 or 3, wherein the pad is part cylindrical.

5. Apparatus according to claim 2, wherein the carrier is mounted for non-rotational movement about an axis generally perpendicular to the longitudinal axis of the rack.

6. Apparatus according to claim 5, wherein the carrier is provided with a pair of flats for non-rotationally mounting the carrier in a key plate attached to a housing for the apparatus.

7. Apparatus according to claim 5, wherein the pad is provided with a slot or recess on a side of the pad opposite to a face of the pad engageable with the rack teeth, the slot or recess receiving an elongated member retained in position by a collar for non-rotationally mounting the carrier.

8. Apparatus according to claim 2, wherein the adjusting means comprises a screw.

9. Apparatus according to claim 1 or 2, further comprising means for relative adjustment of the rack and pinion.

10. Rack and pinion apparatus comprising a toothed rack having a plurality of teeth, the teeth having tops which lie in a common plane, an anti-roll mechanism having rack-teeth-engaging means mounted to permit relative movement between the rack and rack-teeth-engaging means with the rack-teeth-engaging means being in contact with the tops of at least two of the teeth of the rack to restrain rolling of the rack about its longitudinal axis, with the rack-teeth-engaging means comprising roller means.

11. Apparatus according to claim 10, wherein the roller means comprises a single roller oriented generally transverse to the rack and in engagement with the tops of at least two of the teeth of the rack.

12. Apparatus according to claim 10, wherein the roller means comprises a plurality of rollers spaced apart for maintaining at least one roller in engagement with the tops of at least two teeth of the rack.

13. Apparatus according to claim 10, further comprising means for relative adjustment of the rack and pinion.

* * * * *